United Stat [19]

Moriwaki et al.

[11] 3,906,465

[45] Sept. 16, 1975

[54] HOLOGRAM GRAPHIC DATA TABLET APPARATUS USING A VERNIER

[75] Inventors: Masahiro Moriwaki; Mitsuhito Sakaguchi; Yoshinari Mita, all of Tokyo, Japan

[73] Assignee: Nippon Electric Company Limited, Tokyo, Japan

[22] Filed: Aug. 23, 1974

[21] Appl. No.: 499,975

[52] U.S. Cl............................ 340/173 LM; 350/3.5
[51] Int. Cl.[2]........................................ G02B 27/00
[58] Field of Search............... 340/173 LM; 350/3.5

[56] References Cited
UNITED STATES PATENTS
3,658,402   4/1972   Nishida................................ 350/3.5

*Primary Examiner*—Terrell W. Fears
*Attorney, Agent, or Firm*—John M. Calimafde; Robert A. Schroeder; Stephen B. Judlowe

[57] ABSTRACT

A hologram graphic tablet apparatus is described which has an improved resolution. The apparatus includes a hologram plate which includes a plurality of mini-holograms having position code data therein. The hologram plate is sequentially illuminated by a reference laser and an array of vernier lasers. The light from the laser that is diffracted by the mini-holograms is detected to form a reconstructed image of the position data, and the detected information is processed to produce a positional code that has a greater number of bits, and hence greater position resolution, than that directly obtained from the mini-hologram, depending on whether the output codes from the detector are the result of irradiation of the mini-hologram by the reference laser or by the vernier laser array.

5 Claims, 11 Drawing Figures

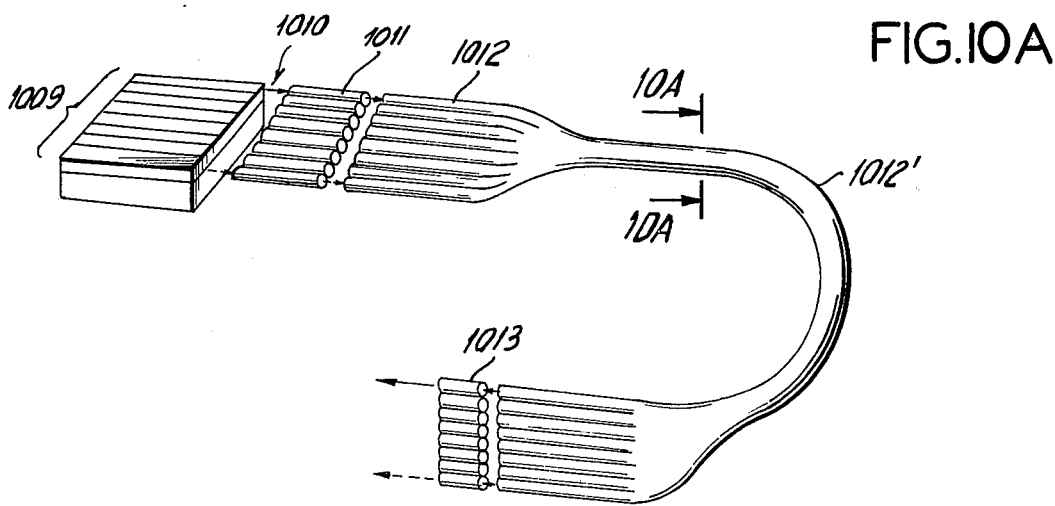
FIG.9
FIG.10A
FIG.10

HOLOGRAM GRAPHIC DATA TABLET APPARATUS USING A VERNIER

The present invention relates generally to hologram graphic data tablet apparatus, and, more particularly, to a hologram graphic data tablet apparatus having a vernier for improving the resolving power of the apparatus.

A hologram graphic data tablet apparatus converts a two-dimensional position into a positional code by reading out a position-representing holographic code by the use of a coherent light beam. The holographic codes are formed in the form of mini-holograms arranged on a hologram plate in columns and rows to permit any points on the two-dimensional plane to be converted into binary codes when irradiated by a thin coherent light beam.

This kind of hologram tablet apparatus has been recognized as one of the most efficient graphic input apparatuses for use in encoding two-dimensional positions into computer input information, particularly in handwritten character recognition, numerical control, and automatic IC mask pattern design.

One prior-art example of a hologram tablet apparatus is disclosed in U.S. Pat. No. 3,658,402 issued to the same assignee as the present application, wherein a hologram plate is divided into a plurality of mini-hologram sections each carrying positional data to permit each section to be converted into a positional code when irradiated by the coherent light beam for read-out. Thus, the positional code of the character or graphic data is obtained in the form of a binary code. It is also proposed in this patent that a pair of hologram plates be arranged in a stacked state with their respective plurality of slits forming a right angle with each other. The positional codes representing the X- and Y-coordinates of the indicating means are recorded as holograms on the hologram plates, respectively, and thus, two-dimensional position data is encoded. According to this prior apparatus, the number of bits per code recordable on the hologram plate is more or less limited because the multiplex recordability peculiar to the hologram is utilized on the hologram plate. However, in the tablet apparatus using two hologram plates, the multiplex recording density can be increased to achieve higher resolving power than in an apparatus using one hologram plate when two-dimensional coordinates are encoded.

However, to broaden the area of application of such a hologram tablet apparatus, still higher resolving power is required. One approach to this need is to reduce the size of each mini-hologram. However, the resolving power that can be achieved with this method is only about $10^3 \times 10^3$ at best because of lens aberration and scratches on the recording medium, and because the light beam must be thin enough to permit mini-holograms of a reduced size to be read out from the hologram plate, which tends to enlarge the reconstructed image, i.e., read-out binary optical code.

It is, therefore, an object of the present invention to provide a hologram graphic data tablet apparatus in which high resolving power is achieved without reducing the size of each mini-hologram.

The hologram tablet apparatus of the invention comprises a hologram plate on which mini-holograms each carrying positional data are arranged in columns and lines. An array of n small-sized vernier lasers is arranged at an interval of $(n-1)/n$ of the width of the mini-hologram. Individual reference and vernier lasers are energized in a predetermined time sequence, and an array of photodetectors detect the light rays emitted by the laser and diffracted by the mini-hologram to form a reconstructed image. The output of the photodetector array is processed to produce a positional code having a greater number of bits than the positional code obtained directly from the mini-hologram depending on whether the output codes from the photodetector array are the result of irradiation by the reference laser or by the vernier laser array. Thus, the resolving power of the apparatus is markedly improved without further reducing the size of each mini-hologram on the hologram plate itself.

The present invention will now be described in greater detail in conjunction with the accompanying drawings, wherein:

FIG. 9 is a diagram illustrating the operation of the embodiment of FIG. 8; and

FIGS. 10 and 10A are diagrams of a semiconductor laser array and an optical scanning member used in the third embodiment.

Although the hologram tablet apparatus of the invention is capable of encoding two-dimensional positions, it is herein described for use in one-dimensional position encoding in order to simplify the explanation of the apparatus.

Figure 1:
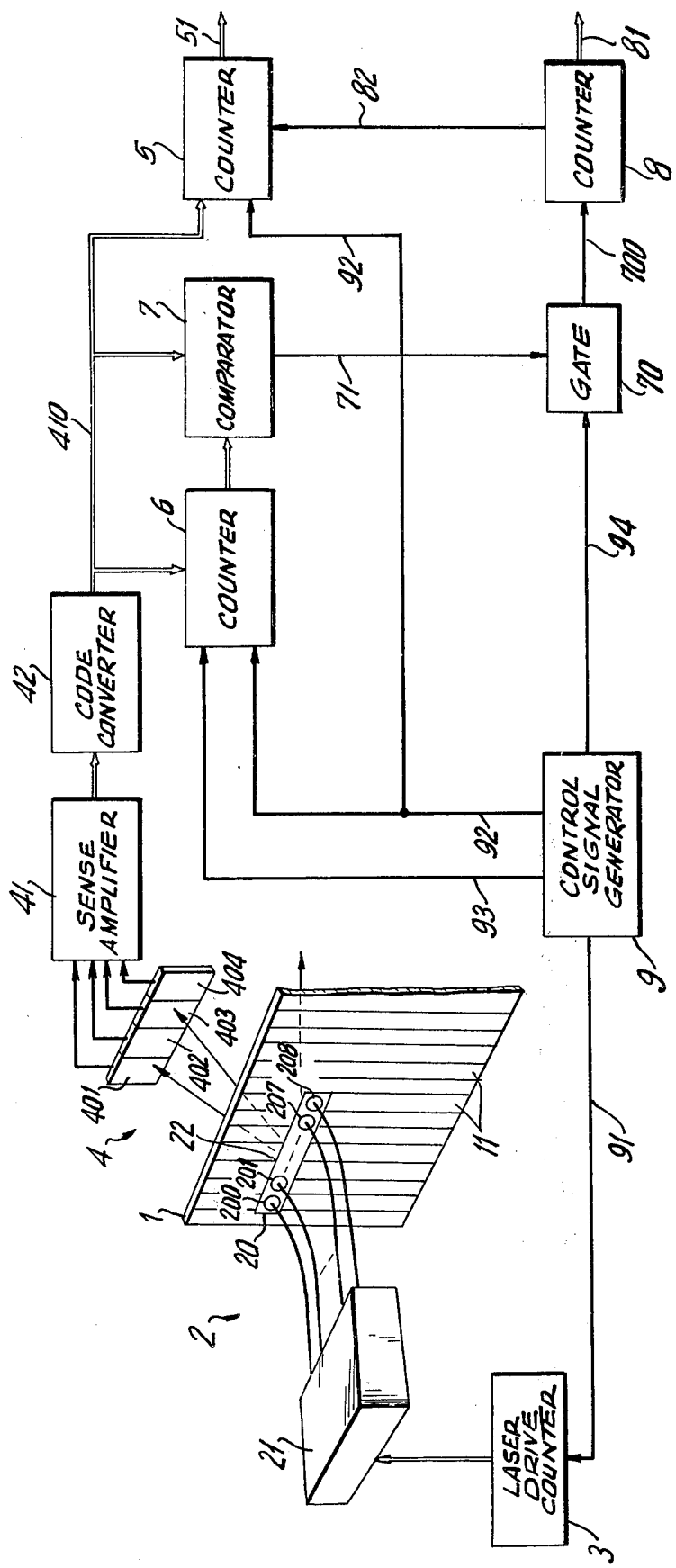
FIG. 1 is a schematic diagram of a hologram tablet apparatus according to a first embodiment of the invention.

In the first embodiment of the invention, illustrated in FIG. 1, a positional code of 4 bits recorded on a hologram plate 1 is read through one reference semiconductor laser and an array of eight semiconductor lasers arranged to function as a vernier. These lasers are disposed at a given distance from the plate 1. As will become apparent, this arrangement improves the resolving power of the hologram tablet apparatus by 3 bits; that is, the apparatus of the invention derives a 7-bit positional code out of a 4-bit positional code actually recorded on the plate 1 in the form of a plurality of mini-holograms 11.

Although the mini-holograms 11 are illustrated in the embodiment of FIG. 1 as being in the shape of a slit to describe one-dimensional coding, holograms 11 may be arranged in a matrix for two-dimensional coding. The positional code recorded on the holograms 11 is given in the Gray code which, as known, is characterized in that there is only a one-bit change in any transition between two adjacent mini-holograms. The structure and function of the Gray code is described in detail in an article titled "The Rand Tablet: A Man-Machine Graphical Communication Device," pages 325 to 331 (especially, in page 328), published in Fall Joint Computer Conference, 1964. Hence, no further description of Gray code will be given here.

An optical scanning member generally designated 2 comprises a semiconductor laser array 20 and a laser drive circuit 21. The laser array 20 is constituted by a reference semiconductor laser 200 and a vernier semiconductor laser array 22 consisting of eight semiconductor lasers 201, 202, . . . , 207, and 208 and is one-dimensionally arranged.

A semiconductor laser drive counter 3 counts a carry pulse sent through a signal line 91 and delivers a semiconductor laser drive signal to the drive circuit 21 to sequentially energize the lasers 200 – 208 in that order.

A photodetector array generally designated 4 detects light rays diffracted at the hologram plate 1, which form a reconstructed holographic image representing the 4-bit positional code stored in the hologram. The photodetector array 4 comprises four photodetectors 401, 402, 403, and 404 corresponding to the four bits of the positional code; a sense amplifier 41 coupled to the photodetectors; and a code converter 42 coupled to the output of sense amplifier 41. Amplifier 41 has four amplifiers (not shown) for amplifying the outputs from the photodetectors 401–404, respectively, and four comparators (not shown) for comparing the four amplifier outputs with a reference voltage. Each comparator generates a "1" output when the amplifier output is higher than the reference voltage, and a "0" output when it is lower than the reference voltage. The structure and function of the comparator is well-known. The construction of the sense amplifier is described in detail in a paper titled "The Hologram Tablet — A New Graphic Input Device," pages 653 to 658 (particularly, FIG. 4 on page 655) published in Fall Joint Computer Conference, 1970. Therefore, no detailed description thereof is given here.

The code converter 42 converts the four-bit positional code, represented by the Gray code and supplied from the sense amplifier 41, into a binary positional code, and sends the converted code to a signal line 410. Since the structure of this converter is described in detail in an article titled "Decipher the Gray Code," pages 70 to 74 (in particular, FIG. 3(a) on page 71), published in Electronic Design 4, Feb. 15, 1970, no further description of the converter is given here.

A positional code generated and supplied from the sense amplifier 41 through the code converter 42 and the signal line 410 is set in a most significant bit counter 5 in response to a counter setting pulse fed from a signal line 92 while the reference laser 200 is energized to generate laser oscillation. Also, the counter 5 carries its content upon the receipt of a counter carry pulse supplied through a signal line 82. The positional code generated from the plate 1 and supplied through the code converter 42 to the signal line 410 is set in a counter 6 in response to a counter setting pulse fed from the signal line 92 while the laser 200 is brought to oscillation. The counter 6 carries its content every time the counter carry pulse is supplied through a signal line 93.

A comparator 7 compares the output code of the code converter 42 with that of the counter 6, and supplies a gate signal to a signal line 71 when they coincide with each other.

A gate circuit 70 gates a counter carry delay pulse sent from a signal line 94 in response to the gate signal sent through the signal line 71 and gives a carry pulse for a least significant bit counter 8 through a signal line 700.

The least significant bit counter 7 consists of a 3-bit counter for counting the carry pulse given through signal line 700, and supplies a carry pulse to the most significant bit counter 5 through a signal line 82 when another carry pulse for the least significant bit counter 8 comes after its content has reached 111.

Figure 2:
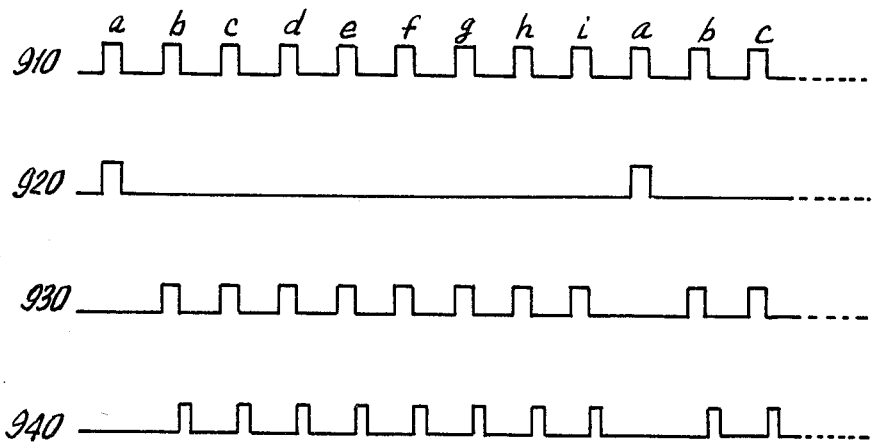
FIG. 2 is a diagram of output waveforms of the control signal generator of the embodiment shown in FIG. 1.

A control signal generator 9 generates a carry pulse 910 for the laser drive counter 3, a counter setting pulse 920, a counter carry pulse 930, and a counter carry delay pulse 940, which are sent to signal lines 91, 92, 93, 94, respectively. The waveforms of these signals are shown in FIG. 2. When the pulse constituents $a$, $b$, . . . . $h$, and $i$ of the pulse 910 are sent to the signal line 91, the lasers 200, 201, . . . and 208 of the laser array 20 are successively energized to generate oscillation in a predetermined time sequence. The counter setting pulse 920 is generated at a timing of the pulse constituent $a$ of the pulse 910 every time the reference laser 200 is energized. The counter carry pulse 930 is generated at the timings of the pulse constituents $b$, $c$, . . . , $h$ and $i$ of the pulse 910 whenever the vernier lasers 201, 202, . . . , 207 and 208 are energized. The counter carry delay pulse 940 is a pulse delayed by a given period of time behind the pulse 930.

Figure 3:
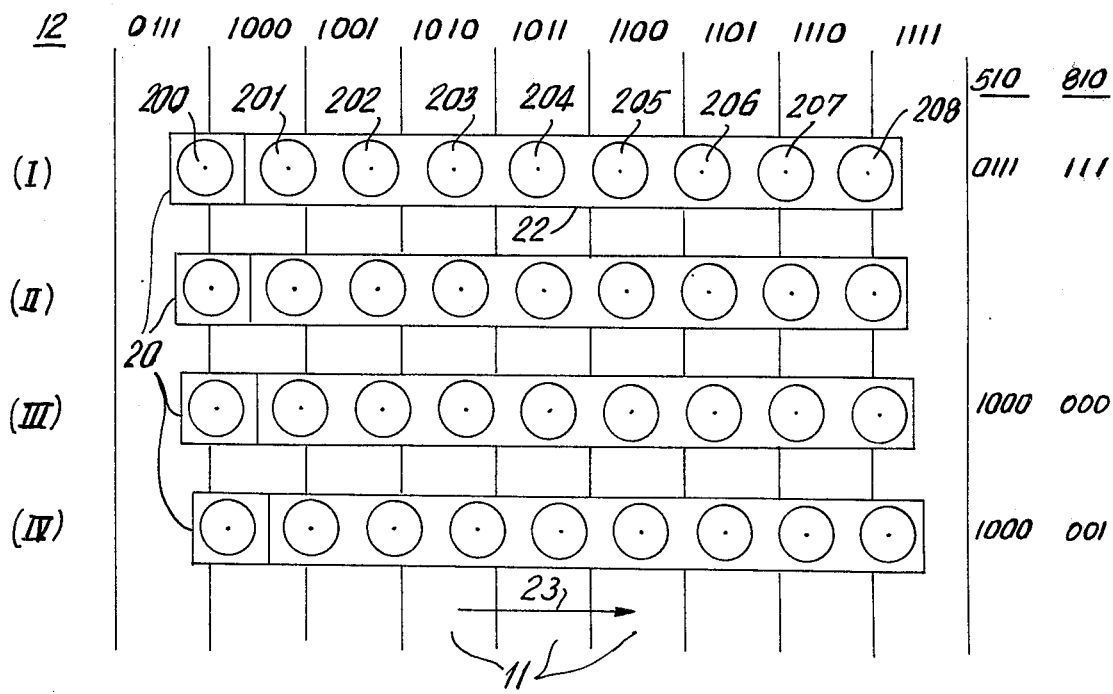
FIG. 3 is a diagram illustrating the operation of the hologram apparatus of FIG. 1.

The operation of the first embodiment of the invention is now described with reference to FIGS. 1 – 3. The mini-holograms 11 are one-dimensionally arranged in a slit form on the hologram plate 1 as shown in FIG. 1. A positional code represented by a reference numeral 12 is converted into a 4-bit binary code and appears on the signal line 410, whereby the positional data recorded in the form of the Gray code on each mini-hologram 11 is derived through the code converter 42. A laser beam spot of each laser of the laser array 20 is formed at an interval of 7/8 of the width of one mini-hologram as shown in FIG. 3. In FIG. 3, (I), (II), (III) and (IV) show the states of the vernier laser array 20 moved by a small distance in the direction of an arrow 23. Reference numerals 510 and 810 indicate the contents of the most significant bit counter 5 and the least significant bit counter 8 placed under the states (I), (II), and (IV), respectively, at a time point the laser 208 of the vernier-functioning laser array 22 has finished its oscillation after the completion of the successive oscillation of the other lasers set in the array 20. It should be noted that (I), (II), (III) and (IV) represent "instantaneous" states of the laser array 20 during the transition, since the cycle of oscillation in the laser array 20 is sufficiently faster than its transition speed. The laser array 20 may be moved on the hologram plate 1 either manually or with a pantograph link in the direction of the arrow 23.

In the following explanation, it is assumed that the positional code read out by the laser beam is a code recorded on a mini-hologram covering more than half of the laser beam spot. When the beam spot falls under such state on the boundary between two mini-holograms 11 each carrying a binary code, as indicated by the reference numeral 12 in FIG. 3, it is impossible to derive an accurate positional code for the boundary region, if the Gray code is not employed for such adjacent mini-holograms. In a practical apparatus, however, the number of bits which can change with respect to the relation between the codes recorded on mutually adjacent mini-holograms 11 is only one because the codes recorded thereon use Gray code as described previously. For example, the positional code given in Gray code adjacent to the positional code 0111 given in Gray code is 0101. As a result, even if the laser beam spot is projected on the boundary between the mini-holograms 11 on which these two positional codes are recorded, no codes other than the two codes 0111 and 0101 will appear, with the result that an accurate positional code can be obtained.

Assuming that the semiconductor laser array 20 occupies a position as shown in the state (I) of FIG. 3, the carry pulse 910a given from the control signal generator 9 through the signal line 91 is supplied to the laser drive counter 3. The counter 3, in response, delivers the laser drive signal to the drive circuit 21, and as a result, the reference laser 200 is energized. The reconstructed image obtained as a result of the irradiation by the mini-hologram 11 is detected by the photodetector array 4, and the detected signal is given in the form of a binary positional code to the signal line 410 through the sense amplifier 41 and the code converter 42. This positional code stands at 0111, which is set in the most significant bit counter 5 supplied with the counter setting pulse 920 given from the generator 9 through the signal line 92. At the same time, the positional code appearing on the signal line 410 is set in the counter 6 supplied with the pulse 920 sent through a signal line 92. The gate signal representing the output of the comparator 7 is sent to the signal line 71 since both the output of the code converter 42, i.e., a binary positional code, and that of the counter 6 are 0111. In this state, the counter carry delay pulse 940 is not generated on the signal line 94 from the control signal generator 9 and consequently, the least significant bit counter 8 remains in the initial state 000. Then, when the carry pulse 910b for the laser drive counter 3 is produced from the generator 9 to the signal line 91, the laser 201 oscillates and the binary positional code given from the code converter 42 to the signal line 410 through the sense amplifier 41 and the code converter 42 becomes 1000. On the other hand, the counter carry pulse 930 is supplied through the signal line 93 to the counter 6 to carry its value to 1000. In other words, the two input signals fed to the comparator 7 coincide with each other, and the comparator 7 generates an output gate signal on the signal line 71. As a consequence, the gate circuit 70 gates the counter carry delay pulse 940 sent through the signal line 94 in response to the gate signal given through the signal line 71 and generates a carry pulse for the least significant bit counter 8 to signal line 700 to cause the counter 8 to carry its content to 001. In this way, the lasers 202, 203, . . . , and 207 are energized to provide oscillation in sequence when the carry pulse constituents 910c, 910d, . . . , and 910h for the laser drive counter 3 are generated in succession from the control signal generator 9 to the signal line 91. Then, the code converter 42 generates binary codes 1001, 1010, . . . , and 1110, and the counter 6 also generates output codes 1001, 1010, . . . , and 1110. Therefore, the comparator 7 keeps generating the gate signal to the signal line 71 to cause the least significant bit counter 8 to carry its content to 111 while the laser 207 is energized. Next, if the carry pulse 910i for the laser drive counter 3 is generated from the generator 9 to the signal line 91 so as to energize the laser 208, no gate signal is produced from the comparator 7 since the output positional code of the code converter 42 is 1110 and that of the counter 6 is 1111. Accordingly, the counter 8 remains at 111. Then, the content of the most significant bit counter 5, i.e., the code 0111 appearing on a signal line 51 generated when the laser 208 has finished its laser oscillation, becomes the most significant bits, and the content of the least significant bit counter 8, i.e., the code 111 appearing on a signal line 81, is added to the most significant bits as the least significant bits, whereby the positional code 0111111 of state (I) with an enhanced resolving power is obtained.

In a similar manner, other positional codes 1000000 and 1000001 are derived from the outputs of the most and least significant bit counters 5 and 8, i.e., from the signals appearing on the signal lines 51 and 81 under the states (III) and (IV) of the laser array 20.

In the event the reference laser 200 and the laser 208 are in the midst of two mini-holograms 11, as shown in the laser array position of the state (II), the positional code generated by the code converter 42 with the lasers 200 and 208 energized cannot be uniquely determined. For instance, if the positional code produced by the code converter 42 with the reference laser 200 energized is 0111, the content of the least significant bit counter 8 is 111 when the laser 207 finishes its laser oscillation after the lasers 201, 202, . . . , and 206 have been energized in succession in a similar manner to the state (I). Furthermore, when the positional code obtained from the code converter 42 with the laser 208 energized is 1110, the positional code 0111111 with the enhanced resolving power is derived from the signal lines 51 and 81 in a similar manner to the state (I). When the positional code generated by the code converter 42 with the laser 208 in oscillation is 1111, the two input signals sent to the comparator 7 coincide with each other. As a result, the comparator 7 generates a gate signal to cause the counter 8 to carry its content to 000. Also, the carry pulse for the most significant bit counter 5 is supplied to the signal line 82 to cause the counter 5 to carry its content to 1000. Consequently, the positional code 1000000 is derived from the signal lines 51 and 81. When the reference laser 200 is energized, if the positional code obtained from the code converter 42 is 1000, the positional code 1000000 is derived from the signal lines 51 and 81 in a similar manner to the state (III).

As is apparent from the foregoing, the resolving power of the hologram tablet of the invention is improved by 3 bits; that is, it is enhanced eight-fold. More precisely, the resolving power obtainable is one-eighth of the size of each mini-hologram. To generalize, by the use of n vernier-lasers arranged in an array, a resolving power equal to 1/nth of the size of one mini-hologram can be realized.

Figure 4:
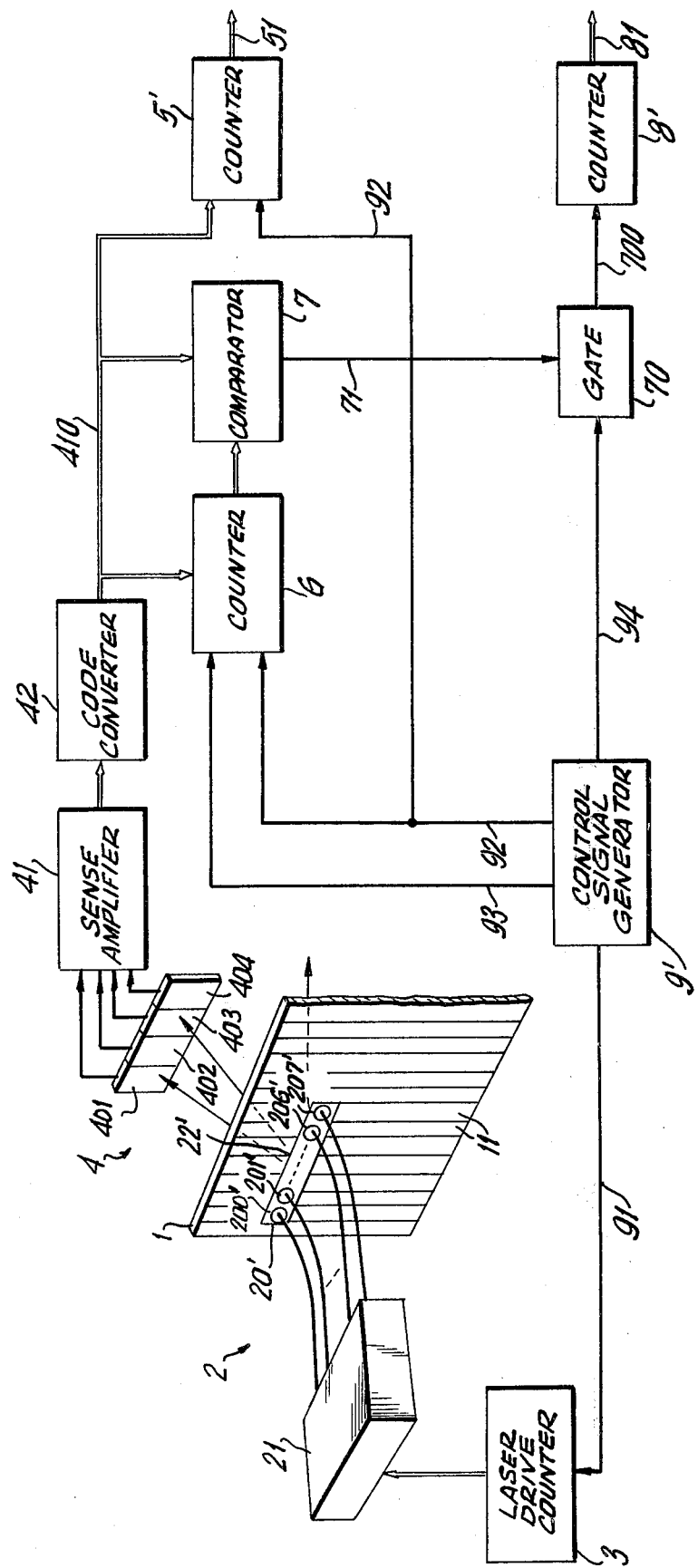
FIG. 4 is a schematic diagram of a hologram graphic tablet apparatus according to a second embodiment of the invention.

FIG. 4 schematically illustrates the arrangement of a second embodiment of the invention wherein a 4-bit positional code recorded on the hologram plate 1 is read out by one reference semiconductor laser and seven vernier semiconductor lasers arranged in an array, thus making it possible to read out a 7-bit positional code. In this way, the resolving power can be enhanced eight-fold. As compared with the first embodiment, the embodiment of FIG. 4 is characterized in that the number of the vernier lasers is reduced by one.

In FIG. 4, those elements denoted by the same reference numerals as those of the first embodiment function to operate in the same manner as those shown in the first embodiment and hence, no further description thereof is provided of these elements.

The optical scanning member 2 consists essentially of the drive circuit 21, and a semiconductor laser array 20' on which one reference semiconductor laser 200' and a vernier semiconductor laser array 22' including seven lasers 201', 202', . . . , and 207' are arranged one-dimensionally.

A most significant bit counter 5' is a register for storing the positional code generated from the hologram plate 1 and supplied to the signal line 410 through the sense amplifier 41 and the code converter 42 when the reference laser 200' is energized in response to the counter setting pulse supplied from the signal line 92. A least significant bit counter 8' consists of a 3-bit counter for counting the carry pulse supplied from the signal line 700.

Figure 5:
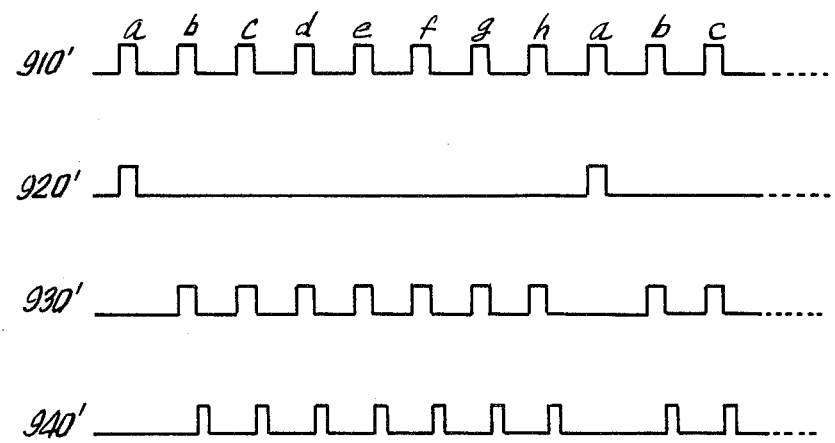
FIG. 5 is a schematic diagram of output waveforms of the control signal generator of the embodiment shown in FIG. 4.

A control signal generator 9' generates a carry pulse 910' for the laser drive counter 3, a counter setting pulse 920', a counter carry pulse 930', and a counter carry delay pulse 940', respectively, to the signal lines 91, 92, 93, and 94. The waveforms of these signals are shown in FIG. 5. When pulse constituents $a, b, \ldots, g$ and $h$ of the counter carry pulse 910' are supplied to the signal line 91, the lasers 200', 201', . . . , 206' and 207' are energized successively in a predetermined time sequence. The counter setting pulse 920' is produced in coincidence with the pulse constituent $a$ of the counter carry pulse 910' each time the laser 200' is energized. The counter carry pulse 930' is generated at the timing of the pulse constituents $b, c, \ldots, g$ and $h$ of the carry pulse 910' whenever the vernier lasers 201', 202', . . . , 206' and 207' are energized. The counter carry delay pulse 940' is a pulse delayed by a given period of time behind the counter carry pulse 930'.

Figure 6:
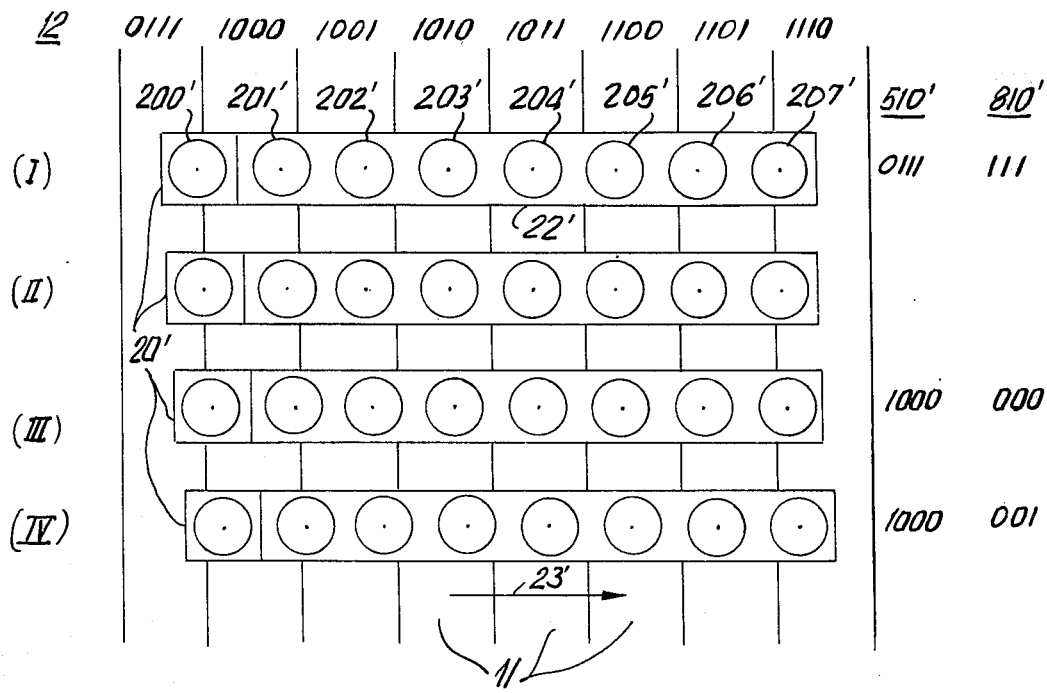
FIG. 6 is a diagram illustrating the operation of the embodiment of FIG. 4.

In FIG. 6, the mini-holograms 11 and the positional code 12 are similar to those shown in FIG. 3. A laser beam spot is formed at an interval of seven-eighths of the width of one minihologram 11. (I), (II), (III), and (IV) shown in FIG. 6 represent the states of the laser array 20' moved by a small distance in the direction of an arrow 23'. Reference numerals 510' and 810' indicate the contents of the most and least significant bit counters 5' and 8' in accordance with the states (I), (III), and (IV) when the laser 207' finishes its laser oscillation after the lasers 201' through 206' of the vernier laser array 22' have been energized in succession.

In the operation of the second embodiment, the laser array 20' may be moved in the direction of the arrow 23' on the plate 1 either manually or by means of a pantograph link. Assuming now that the laser array 20' is disposed at the position (I) of FIG. 6, the carry pulse 910'$a$ generated from the control signal generator 9' through the signal line 91 is supplied to the laser drive counter 3. For this reason, the counter 3 generates a laser drive signal to the drive circuit 21 to energize the reference laser 200' to generate oscillation. The image reconstructed from the mini-hologram 11 is detected by the photodetector array 4, and the thus detected signal is delivered as a binary positional code to the signal line 410 through the sense amplifier 41 and the code converter 42. This positional code is 0111, which is set in the most significant bit counter 5' supplied with the counter setting pulse 920' from the signal generator 90' through the signal line 92. Simultaneously, the positional code appearing on the signal line 410 is set in the counter 6 supplied with the counter setting pulse 920' through the signal line 92. A gate signal equivalent to the output of comparator 7 is sent to the signal line 71 since the output of the code converter 42, i.e., a binary positional code, and that of the counter 6 are both 0111. In this state, the counter carry delay pulse 940' is not produced from the generator 9' to the signal line 94 and accordingly, the least significant bit counter 8' remains in the initial state 000. Then, when the carry pulse 910'$b$ is generated from the generator 9' to the signal line 91, the laser 201' is energized and the binary positional code given from the code converter 42 to the signal line 410 through the sense amplifier 41 becomes 1000. The counter carry pulse is supplied through the signal line 93 to the counter 6 to carry its value to 1000. As a result, the two input signals given to the comparator 7 coincide with each other. The comparator 7 then generates an output gate signal on the signal line 71. As a consequence, the gate circuit 70 gates the counter carry delay pulse 940' fed through the signal line 94 in response to the gate signal sent via the signal line 71, and delivers a least significant bit counter carry pulse to the signal line 700, whereby the least significant bit counter 8' carries its value to 001. In this manner, the lasers 202', 203', . . . , and 207' are energized to provide oscillation in sequence when the carry pulses 910'$c$, 910'$d$, . . . , and 910'$h$ for the laser drive counter 3 are generated in succession from the generator 9' to the signal line 91. Under this condition, the output binary codes of the code converter 42 are 1001, 1010, . . . , and 1110, and those of the counter 6 are also 1001, 1010, . . ., and 1110. Therefore, the gate signal is successively supplied from the comparator 7 to the signal line 71 to permit the counter 8' to carry its content to 111 while the laser 207' is in oscillation. Then, the content of the most significant bit counter 5', i.e., the code 0111 generated on the signal line 51 by the time the laser 207' completes its oscillation, becomes the most significant bits, and the content of the least significant bit counter 8', i.e., the code 111 appearing on the signal line 81 is added to the most significant bits as the least significant bits whereby a positional code 0111111 of state (I) with an enhanced resolving power is obtained.

In a similar manner, other positional codes 1000000 and 1000001 are derived at the outputs of the counter 5' and the counter 8' or, in other words, from the signals appearing on the signal lines 51 and 81 under the states (III) and (IV) of the laser array 20'.

If the reference laser 200' is in the midst of two mini-holograms as shown in the laser array position of the state (II), the positional code obtained from the code converter 42 when the laser 200' is in oscillation is not uniquely determined. Assuming that the positional code generated by the code converter 42 with the reference laser 200' in oscillation is 0111, the content of the least significant bit counter 8' obtained by the time laser 207' finishes its oscillation is 111. Thus, the positional code 0111111 is derived from the signal lines 51 and 81. When the reference laser 200' is energized, if the positional code obtained from the code converter 42 is 1000, the positional code 1000000 is obtained in a similar manner to the state (III).

With the hologram tablet apparatus of the invention, the resolving power can be improved by 3 bits, as compared to conventional apparatus of this type; that is, the resolving power is enhanced eight-fold, making it possible to distinguish a distance of one-eighth of the mini-hologram interval. To generalize, by the use of $(n-1)$ vernier semiconductor lasers 201' to 207', the resolving power can be enhanced by a factor of $n$.

Figure 7:
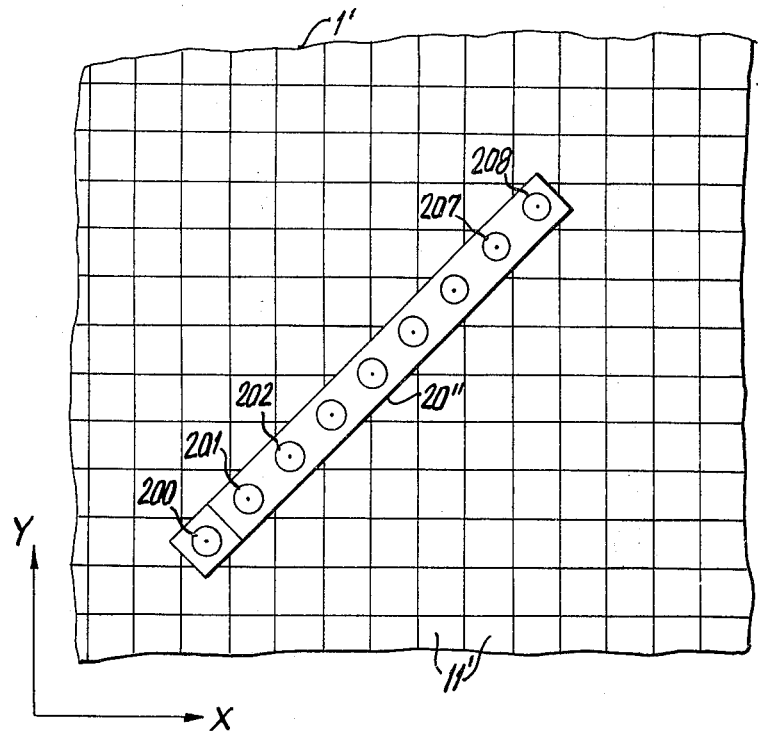
FIG. 7 is a diagram illustrating the relationship between a semiconductor laser array and a hologram plate for the purpose of obtaining two-dimensional positional information in the hologram tablet apparatus of the invention.

The description of the embodiments of the invention thus far discussed has been of the case of encoding one-dimensional positions. However, a two-dimensional position can readily be encoded, for example, by the use of a hologram plate 1' and a semiconductor laser array 20'' as shown in FIG. 7. The plate 1' comprises square mini-holograms 11' arranged in a matrix, and the laser array 20'' is capable of forming laser beam spots one dimensionally arranged at an angle of 45° with respect to the X and Y axes. Also, the beam spots are arranged at an interval of 7 $\sqrt{2/8}$ of the width of one mini-hologram from each other.

Figure 8:
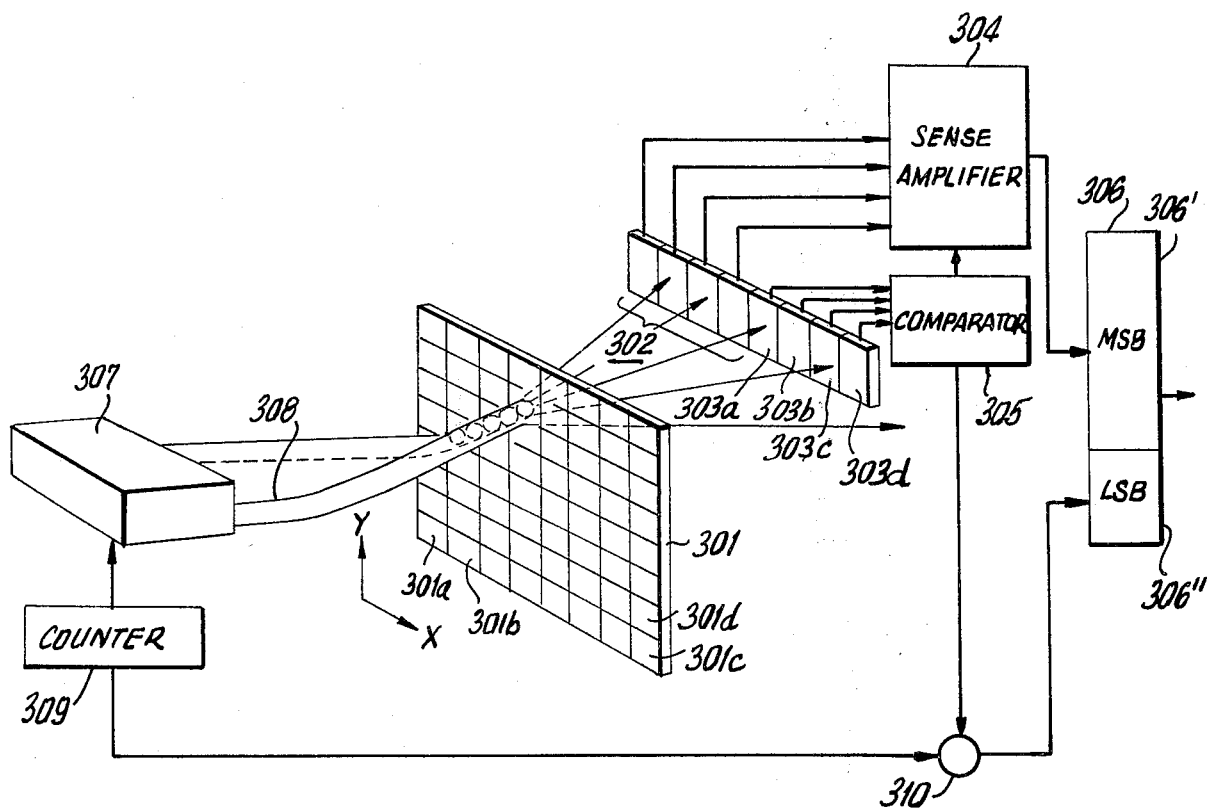
FIG. 8 is a diagram of a hologram tablet apparatus according to a third embodiment of the invention.

In the third embodiment of the invention shown in FIG. 8, a hologram plate 301 is formed of a plurality of miniholograms, each of which records a binary positional code to be detected by a photodetector array 302, X-adjacent coordinate discriminating information for producing reconstructed images on photodetectors 303a and 303b to discriminate adjacent holograms in the direction of the X axis, and Y-adjacent coordinate discriminating information for producing reconstructed images on photodetectors 303c and 303d to discriminate adjacent holograms in the direction of the Y axis. More specifically, the X-adjacent coordinate discriminating information is recorded on the hologram plate 301 so that the reconstructed images can be obtained on the photodetectors 303a and 303b, respectively, from slit-like holograms 301a and 301b formed along the X axis. This recording process is repeated with respect to the Y axis. Similarly, the Y-adjacent coordinate discriminating information is recorded on the plate 301 so that the reconstructed images can be obtained on the photodetectors 303c and 303d, respectively, from slit-like holograms 301c and 301d formed along the Y axis. This recording process is repeated with respect to the X axis. A sense amplifier 304 amplifies the output of the photodetector array 302 and a comparator 305 detects the difference between the outputs of the photodetectors 303a and 303b and that between the outputs of the photodetectors 303c and 303d to generate timing signals so that the output of the sense amplifier 304 is written into the MSB (Most Significant Bit) side 306' of a register 306. A gate 310 is opened to allow the content of a counter 309 to be written into the LSB (Least Significant Bit) side 306'' of the register 306. A semiconductor laser array 307 comprises a one-dimensional semiconductor laser array and a drive circuit capable of oscillating the semiconductor lasers in a time sequence. A flexible optical scanning member 308 guides the laser beams from the semiconductor lasers to the hologram plate 301. The member 308 is fastened at an angle of 45° with the orthogonal coordinates of the plate 301. A counter circuit 309 counts up its content every time the laser array 307 is energized to generate oscillation.

In the embodiment of FIG. 8, the code converter 42 used in the first and second embodiments, is not employed, because the positional code recorded on the mini-holograms of the plate 301 is not the Gray code but an ordinary binary code.

FIG. 9 describes one-dimensional operation of the third embodiment for simplicity of illustration. Reference numeral 321 denotes nine slit-shaped mini-holograms, and reference numeral 322 stands for the positional codes recorded on the individual mini-holograms. Each positional code is given in terms of a 4-bit binary code. Reference numeral 323 indicates which of the photodetectors 303a or 303b presents a reconstructed image when a laser beam is incident upon the mini-hologram 321. For example, if the laser beam is incident upon a mini-hologram indicated under the symbol $a$ in FIG. 9, the reconstructed image is produced on the photodetector 303a. When the laser beam is incident upon a mini-hologram shown as the symbol $b$, the reconstructed image is produced on the photodetector 303b. In the case where the laser beam is projected on the boundary between two adjacent mini-holograms, the reconstructed image of the light intensity proportional to the laser-beam-irradiated area $a$ of the mini-hologram is produced on the photodetector 303a. Simultaneously, the reconstructed image of the light intensity proportional to the laser-beam irradiated area b of the mini-hologram is produced on the photodetector 303b. Reference numeral 324 denotes an optical scanning member for guiding the laser beam to the hologram plate 301. The optical scanning member 324 generates eight laser beam spots 325①,②... , and ⑧ arranged at an interval of seven-eighths of the width of one mini-hologram, with one laser beam spot ① being interposed between the spots ① and ②. The diameter of the laser beam spot is about one-half of the distance between two adjacent laser beam spots as shown in FIG. 9. The member 324 is moved slightly in the direction of an arrow 327 to the positions indicated by (I), (II), (III), and (IV). Laser beam spot positions 325' with oblique lines drawn from right to left indicate each position where a positional code is read out from the mini-hologram 321 on which one beam spot is projected. In contrast, laser beam spot positions 325'' with oblique lines drawn from left to right indicate each position where the output difference between the photodetectors 303a and 303b becomes small enough when the laser beam spots 325①,②, ... ,⑦and⑧are projected on the plate 301. Reference numeral 326 indicates the contents stored in the output register 306 in the states (I), (II), (III), and (IV); reference numeral 326' indicates positional codes recorded on individual miniholograms 321; and reference numeral 326'' indicates the order of the laser beam spot positions 325'' counted in sequence from spot ① to spot ⑧ (except ①) of the laser beam spot array 325 and represented in terms of a binary code.

In the operation of the embodiment of the invention of FIG. 8, the optical scanning member 308 is moved on the plate 301 either manually or with a pantograph link to write information such as a graph and a character. The movement of the member 308 may be in the direction of the arrow 327 (FIG. 9). Each laser included in the laser array 307 is energized in succession at a sufficiently high speed relative to the movement of the member 308. The counter 309 functions to indicate which one of the lasers is placed in oscillation. The positional code of the reconstructed image obtained from the plate 301 illuminated with the laser in oscillation is focused on the photodetector array 302, and the adjacent coordinate discriminating information is imaged on the photodetectors 303a, 303b, 303c and 303d. Inasmuch as the member 308 is fastened at an angle of 45° with the orthogonal coordinates of the plate 301, it can read out the positional codes in both the X-axis and Y-axis directions. However, for simplicity of explanation, one-dimensional operation of the invention is described hereinafter.

Assume that the member 308 is positioned in the state (I) of member 324 of FIG. 9. When the laser spot 325①is energized, an image is reconstructed from the corresponding mini-hologram 321. Then, because the output difference between the photodetectors 303a, and 303b is sufficiently large, bits 0, 1, 1, 1 of the positional code are read out by the sense amplifier 304 and written into the register 306. The output difference between the photodetectors 303a and 303b is not reduced by energizing the laser spots 325①,②③④⑤⑥and⑦ in succession. However, if the laser spot 325⑧is energized, the intensities of the images reconstructed on the photodetectors 303a and 303b become nearly equal to each other to minimize the output difference between the two photodetectors. This shows that the main scale of the mini-hologram 321 coincides with the auxiliary scale (vernier) of the laser array 324. Under this condition, the gate 310 is opened and the output 1, 1, 1 of the counter 309 is written into the register 306. The content of the register 306 is indicated by the reference numeral 326. The output of the register 306, 1, 0, 0, 0, 0, 0, 1, and 1, 0, 0, 0, 0, 1, 0 can be obtained in a similar manner as mentioned above, even if the optical scanning member 308 is in the states (III) and (IV), respectively. Assuming that the member 308 is positioned in state (II), the output difference between the photodetectors 303a and 303b with the laser spot 325①in oscillation is small and, therefore, the main scale of the mini-hologram 321 coincides with the vernier of the laser array 324. Then, the gate 310 is opened and the output 0, 0, 0 of the counter 309 is written into the LSB side 306'' of the register 306. The output difference between the photodetectors 303a and 303b becomes large enough when the laser spot 325① is in oscillation. The positional code in this state is read out by the photodetector array 302 and the sense amplifier 304 and then written into the MSB side 306' of the register 306. Thus, the written content becomes 1, 0, 0, 0, 0, 0, 0 as indicated by the reference numeral 326.

In the third embodiment, the X- and Y-adjacent coordinate discriminating information are used whereby the resolving power is improved by 3 bits, or eight-fold, without using Gray code and the code converter 42 (FIGS. 1 and 4). To generalize, the resolving power can be improved by a factor of $n$ by the use of ($n+1$) lasers arranged in an array.

As has been described above, the laser array is used separately from the drive circuit in the first and second embodiments. In the third embodiment, however, the laser array may be used integrally with the drive circuit 307, and only the laser beam is led to the hologram plate 301 by way of the flexible member 308.

The optical part comprising the laser array 302 and the member 308 is described in more detail referring to FIG. 10, which illustrates an array generally designated 1009 having eight semiconductor lasers although He-Ne gas lasers may also be employed. If a voltage is applied to each semiconductor laser, a laser beam emanates from a junction 1010 and enters a lens array 1011. The laser beam undergoes beam conversion in the lens array 1011 and is led to an optical fiber array 1012. Although both the incident end and the emission end of the fiber array 1012 should be arranged one-dimensionally, it is desirable for easier handling that the fiber array 1012 be bundled in its middle part 1012' as indicated by a section AA'. The beam emitted from the fiber array 1012 is subjected to beam conversion in a lens array 1013 and applied to the hologram plate.

As is evident from the foregoing, the present invention makes it possible to obtain a positional code having a larger number of bits than the positional code recorded on the hologram coding plate by the use of a hologram graphic data tablet apparatus using a vernier constructed and operated on the principles and in the manner disclosed hereinabove. Therefore, the hologram tablet apparatus of the invention is very useful, especially in pattern recognition and numerical control equipment where graphic information must be efficiently digitized.

It will be apparent from the foregoing description that a number of alternatives and modifications can be made without departing from the spirit and scope of the present invention.

What is claimed is:

1. A hologram graphic data tablet apparatus comprising a hologram plate having a plurality of position-representing mini-holograms recorded thereon, a reference laser, an array of $n$ or ($n-1$) vernier lasers arranged at an interval of ($n-1$)/$n$ of the width of one of said mini-holograms, means for energizing said reference and said vernier lasers in a predetermined time sequence, means for detecting the light rays emitted by said lasers and diffracted at said mini-holograms forming a reconstructed image, and means for processing the output of said detecting means to produce a positional code having a greater number of bits than the positional code obtained directly from said mini-holograms depending on whether the output codes from said detecting means are the result of irradiation by said reference laser or by said vernier laser array.

2. The hologram tablet apparatus of claim 1, in which said processing means includes a most significant bit counter coupled to said detecting means for receiving the position code, a second counter also receiving the position code, and a comparator for comparing the position code and the contents of said second counter and for producing a gating signal upon their coincidence.

3. The hologram tablet apparatus of claim 2, further comprising a least significant bit counter, a control signal generator for developing control signals for controlling the energizing of said lasers and a carry pulse for said least significant bit counter, and gating means for applying said carry pulse to said least significant bit counter upon the presence of said gating signal.

4. A hologram graphic data tablet apparatus comprising a hologram plate having a plurality of position-representing and boundary region-discriminating mini-holograms recorded thereon in columns and lines, an optical scanning member having an array of n first lasers arranged at an interval of ($n-1$)/$n$ of one mini-hologram and a second laser disposed in the middle of a preselected pair of said first lasers, a drive circuit for energizing said first and second lasers in a predetermined time sequence, a counter circuit for indicating which one of said lasers is energized, first means for detecting a first reconstructed holographic image created by the irradiation by said lasers of said mini-holograms for determining the positional data recorded in the irradiated mini-hologram, second means for detecting a second reconstructed holographic image in a manner similar to said first detecting means for determining the adjacent-mini-hologram discriminating data, and means for comparing the intensities of two reconstructed images for discriminating adjacent mini-holograms from each other on each orthogonal coordinate, whereby the positional data and the adjacent-mini-hologram discriminating data are generated from the mini-hologram for obtaining a positional code with enhanced resolving power.

5. The hologram data tablet apparatus of claim 4, further comprising a register having a most significant bit stage and a least significant bit stage, means for storing the output of said first detecting means in said most significant bit stage, and gating means for applying the contents of said counter circuit to said least significant bit stage.

* * * * *